United States Patent Office 3,341,491
Patented Sept. 12, 1967

3,341,491
VULCANIZED EPIHALOHYDRIN POLYMERS
Anderson E. Robinson, Limestone Gardens, and William D. Willis, Limestone Acres, Del., assignors to Hercules Incorporated, Wilmington, Del., a corporation of Delaware
No Drawing. Filed May 4, 1966, Ser. No. 547,453
The portion of the term of the patent subsequent to Mar. 8, 1983, has been disclaimed
18 Claims. (Cl. 260—45.75)

This application is a continuation-in-part of our co-pending application Ser. No. 202,985, filed June 18, 1962, now abandoned.

The present invention relates to vulcanized epihalohydrin polymers and to their preparation.

Epihalohydrin polymers have been vulcanized, i.e., cross-linked in the past with polyamines alone or monoamines in the presence of at least one agent from the group sulfur, dithiocarbamates, thiuram sulfides and thiazoles, to produce rubbers that have good attributes and can be used in diverse specialty rubber applications.

Now in accordance with this invention, it has unexpectedly been found that high molecular weight polymers and copolymers of epihalohydrins can be cross-linked with at least one metal compound selected from the group consisting of salts of aromatic carboxylic acids, salts of aliphatic carboxylic acids, salts of carbonic acid, salts of phosphorous acid, salts of silicic acid and oxides of the metals of Groups IIA, IIB, and IVA of the Periodic Table (Lange's Handbook of Chemistry, 8, pages 56–57 (1952)), and at least one heterocyclic compound selected from the group consisting of 2-mercaptoimidazolines and 2-mercaptopyrimidines.

Any high molecular weight solid polymer, homopolymer or copolymer of an epihalohydrin as, for example, epichlorohydrin or epibromohydrin homopolymers, copolymers of two different epihalohydrins, or copolymers of an epihalohydrin with one or more other epoxides can be cross-linked to produce the new vulcanizates of this invention. These polymers are readily prepared by the polymerization of epihalohydrins with, for example, organoaluminum compounds as catalysts. Particularly effective catalysts for the polymerization of epihalohydrins are alkylaluminum compounds that have been reacted with from about 0.2 to about 1 mole of water per mole of alkylaluminum compound. The polymers obtained by these catalysts may be essentially wholly amorphous or crystalline or they may be a mixture of the amorphous and crystalline polymers. Generally, the amorphous polymers provide the most rubbery vulcanizates, the crystalline polymers on vulcanization tending to be hard, brittle, and lacking in elasticity. These properties are, of course, useful in the case of relatively rigid molded articles which can be prepared by molding the compounded polymer and then curing to cross-link and set it. However, excellent rubbers are obtained by vulcanizing mixtures of amorphous and crystalline polymers. In this case, the amount of the crystalline polymer is generally less than about 25–30% of the mixture.

When epihalohydrins are polymerized by the above process, polymerization takes place at least in major part through the epoxide linkage so that the product is a polyether containing halomethyl groups attached to the main polymer chain. The homopolymers are believed to have the following general formula:

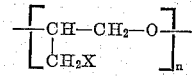

where X is halogen. In the same way, when an epihalohydrin is copolymerized with one or more other epoxides (including other epihalohydrins), polymerization takes place through the epoxide linkage even though other polymerizable groups may be present. Typical of epoxides that can be copolymerized with an epihalohydrin to produce a copolymer that can be cross-linked in accordance with this invention are the alkylene oxides such as ethylene oxide, propylene oxide, butene oxide, etc.; butadiene monoxide, cyclohexene oxide, vinyl cyclohexene oxide, epoxide ethers such as ethyl glycidyl ether, 2-chloroethyl glycidyl ether, hexyl glycidyl ether, allyl glycidyl ether, etc.

As pointed out above, the polymers of an epihalohydrin that are vulcanized, i.e., cross-linked in accordance with this invention, are high molecular weight solid polymers. Any homopolymer or copolymer that has a reduced specific viscosity of at least about 0.2, i.e., a molecular weight of at least about 40,000, can be cross-linked with the agents of this invention to yield a polymer of increased tensile strength and modulus. The term "Reduced Specific Viscosity" (RSV) which is a function of molecular weight is used herein to designate the specific viscosity measured at 100° C. on an α-chloronaphthalene solution of the polymer containing 0.1 g. per 100 ml. of solution divided by the concentration of the solution. Polymers having an RSV above about 0.2 and preferably above about 0.5 on cross-linking yield excellent general purpose specialty rubbers.

These epihalohydrin polymers generally contain a small amount (i.e., from about 0.1% to about 2% by weight) of antioxidant added at the time of their preparation. It may in some cases be desirable to add a small additional amount of antioxidant before or at the time of cross-linking the polymer. Exemplary of the most preferable antioxidants are phenyl-β-naphthylamine, di-β-naphthyl-p - phenylenediamine, sym - di-β-naphthyl-p-phenylenediamine, N-isooctyl-p-aminophenol, the reaction product of diphenylamine and acetone, polymerized trimethyldihydroquinoline, 4,4'-thio-bis(6-tert-butyl-m-cresol), the reaction product of crotonaldehyde and 3-methyl-6-tert-butyl phenol, nickel dibutyldithiocarbamate, the zinc salt of 2-mercaptobenzimidazole, etc.

Epihalohydrin polymers are cross-linked in accordance with this invention by heating a mixture of the polymer, at least one metal compound as defined above and at least one heterocyclic compound selected from the group consisting of 2-mercaptoimidazolines and 2-mercaptopyrimidines.

Any 2-mercaptoimidazoline, i.e., any compound having the general formula

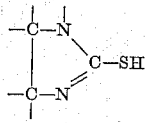

can be used in combination with one or more of the above defined metal compounds to cross-link an epihalohydrin polymer. Exemplary of the 2-mercaptoimidazolines that can be used are 2-mercaptoimidazoline, 4-methyl-2-mercaptoimidazoline, 5 - ethyl-4-butyl-2-mercaptoimidazoline, etc.

Any 2-mercaptopyrimidine, i.e., any compound having the general formula

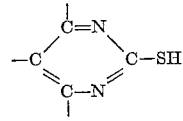

can be used in combination with one or more of the above defined metal compounds to cross-link an epihalohydrin polymer. Exemplary of the 2-mercaptopyrimidines that can be used are 2-mercaptopyrimidine, 4,6-dimethyl-2-mercaptopyrimidine, 5-butyl-2-mercaptopyrimidine, 4-ethyl-5-propyl-2-mercaptopyrimidine, etc.

The heterocyclics are most effective as cross-linking agents for epihalohydrin polymers when used in combination with one or more metal compounds. These metal compounds, as stated above, are selected from the group consisting of salts of aromatic carboxylic acids, salts of aliphatic carboxylic acids, salts of carbonic acid, salts of phosphorous acid, salts of silicic acid and oxides of the metals of Periodic Groups IIA, IIB and IVA. Exemplary of these metal compounds are stannous oxide, stannic oxide, lead monoxide, red lead oxide, germanium monooxide, calcium oxide, zinc oxide, magnesium oxide, zinc carbonate, lead carbonate, dibasic lead carbonate, calcium carbonate, mercuric carbonate, beryllium carbonate, lead orthosilicate, barium silicate, cadmium silicate, magnesium silicate, dibasic lead phthalate, magnesium benzoate, calcium benzoate, zinc salicylate, strontium salicylate, lead azelate, lead oleate, dibasic lead stearate, lead sebacate, the lead salt of tetradecane dibasic acid, dibasic lead phosphite, magnesium phosphite, etc.

Those metal compounds containing lead are most preferred since in addition to aiding the cross-linking they tend to increase the stability of the product against heat and oxidation degradation. Therefore, it may be desirable to add at least a small amount, i.e., from about 0.2% to about 5.0% by weight, of lead compound even when one or more other metal compounds are being used to aid in cross-linking, although desirably even larger amounts may be used. Particularly effective in improving heat aging resistance are the lead salts of aliphatic dicarboxylic acids containing from about 4 to about 14 carbon atoms, such as adipic acid, suberic acid, azelaic acid, sebacic acid, tetradecane dibasic acid, etc. These compounds may be added directly in the form of the salt or as the combination of a lead oxide such as red lead oxide with an aliphatic dicarboxylic acid, which will form the lead salt in situ. When adding the lead and the acid separately best results have been obtained when using a ratio of lead oxide to aliphatic dicarboxylic acid of from about 2.5 to about 1.8 by weight. Where the toxicity of lead compounds becomes a problem, such as in food packaging applications, a small amount, i.e., from about 0.5% to about 20% by weight, of pentaerythritol can be used to stabilize the vulcanizable compositions. The combination of 2-mercaptoimidazoline, zinc oxide and pentaerythritol has been found to be particularly advantageous in preparing stabilized, nontoxic, cross-linked epihalohydrin polymers. Of course, there are cases in which a stabilizer is not required and excellent vulcanizates can be obtained without it.

Varied amounts of the cross-linking agents can be added and the optimum amount of each cross-linking agent will depend upon the degree of cross-linking desired, the nature of the other cross-linking agents employed, etc. Generally, the amounts added (based on the weight of the polymer) will be within the following ranges: metal compound, from about 2% to about 20%; heterocyclic cross-linking agent, from about 0.2% to about 10%.

The cross-linking agents (and stabilizer if one is used) can be incorporated or admixed with the polymer in any desired fashion. For example, they can be uniformly blended with a polymer by simply milling on a conventional rubber mill or mixing in a Banbury mixer. By this means, the agents are uniformly distributed throughout the polymer and uniform cross-linking is effected when the blend is subjected to heat. It is generally preferable to mill at temperatures within the range of from about 70° F. to about 200° F. However, the blends are highly scorch-resistant below about 250° F. Other methods of admixing the cross-linking agents with the polymer will be apparent to those skilled in the art.

The conditions under which the cross-linking is effected can be varied over a wide range. Cross-linking can be effected in minutes at temperatures around 300° F. or in days at room temperature. In general, the cross-linking temperature will be within the range of from about 250° F. to about 450° F. The time will vary inversely with the temperature and will range from about 10 seconds to about 120 minutes. Cross-linking will generally be conducted in metal molds under a compression of at least about 500 p.s.i.

In addition to the cross-linking agents, other ingredients can also be incorporated. The additives commonly used in rubber vulcanization can be used here also, as, for example, extenders, fillers, pigments, plasticizers, softeners, etc. The presence of a filler and, in particular, carbon black, is beneficial and, as in rubber compounding gives optimum results. Obviously, there are many cases in which a filler is not required or desired and excellent results are achieved when only the cross-linking agents are added.

The following examples will illustrate the process of cross-linking epihalohydrin polymers in accordance with this invention and the vulcanizates so obtained. All parts and percentages are by weight.

GENERAL PROCEDURE FOR PREPARATION OF VULCANIZATES

In all of the examples, polymer stocks were made up by mixing on a two-roll mill (rolls maintained at about 73° F.) one hundred parts of dry polymer with the specified cross-linking agents and any other additives for about 5 minutes. The polymer was first added to the mill and when it banded (within about 2 minutes) the other ingredients were added in the general order: carbon black filler followed by metal compounds followed by antioxidant followed by heterocyclics. Where the recipes indicate omissions, the order of addition was merely advanced. All stocks were then cured in two-part steel molds for 45 minutes at 310° F. under 1000 p.s.i. minimum pressure. Specimen thickness was approximately 100 mils.

The extent of cross-linking is indicated by the resulting vulcanizate's insolubility in (expressed as percent gel), and swelling by (expressed as percent swell) toluene which is a complete solvent for the polymers and the unvulcanized compounds. Insolubility results upon the integration of individual polymer molecules into a three dimensional cross-linked macromolecule. Solvents which readily dissolved the polymer prior to vulcanization thereafter merely swelled the vulcanizate without appreciably altering its contours. The degree of swelling is proportional to the "molecular weight" of the polymer molecule segments between adjacent cross-links, i.e., inversely proportional to the cross-link density or state of cure. In a vulcanizable composition, the insolubility or gel range of 0–100% is traversed in the early stages of vulcanization while in an incompletely vulcanized composition the 100% gel level is never reached. Zero percent gel signifies a totally deficient composition. A 100% gel indicates a hypothetical minimal cure state in which each original polymer molecule is joined to one other molecule by one cross-link. The swelling of such a vulcanizate by a solvent would be very high, corresponding to a swell value of several thousand percent. Consistent with the high statistical improbability of occurrence of a perfectly ordered distribution of cross-links, it is observed in practice that the swell value decreases continuously as the gel value increases, indicating that cross-links are established randomly. Thus, it is found in practice that the first isolatable minimally-cured 100% insoluble vulcanizate contains more than 1 cross-link per original polymer molecule, the actual number being around 10, corresponding to swell values of the order of 1000%. It is found that, for good product performance, even higher cross-link densities than 10 are necessary. Optimum densities are normally found in the range of 20–40, corresponding inversely to swell values of from about 100% to about 400%. Higher cross-link densities, i.e., lower swell values than about 100%, indicate a proportional degree of overcure.

In all of the examples, percent gel and swell were determined as follows. A one-half inch diameter by 100 mil disc-shaped specimen was weighed then macerated in 60 cc. of toluene for 4 hours at 176° F. The swollen sample was then blotted free of excess toluene and promptly weighed in the swollen condition. The specimen was then dried in vacuum for 4 hours at 176° F. and reweighed. The initial, swollen, and dry weights were each corrected (for nonpolymer components of the specimen) to a 100% polymer base. From these figures $$\frac{\text{corrected dry weight}}{\text{corrected initial weight}} \times 100 = \text{percent gel}$$

Similarly, percent swell is calculated by the formula $$\frac{\text{corrected swollen weight} - \text{corrected dry weight}}{\text{corrected dry weight}} \times 100 = \text{percent swell}$$

Each sample of polymer used in Examples 1–47 contained 1 part per hundred of phenyl-β-naphthylamine. Each sample of polymer used in Examples 48–55 contained 0.5 part per hundred of the reaction product of crotonaldehyde and 3-methyl-6-tert-butyl phenol.

*Examples 1–15*

In these examples, polyepichlorohydrin was milled and cross-linked with 2-mercaptoimidazoline and one or more metal oxides, and the extent of vulcanization compared with controls wherein the imidazide was omitted. The amounts of the ingredients (by parts) in each formulation, along with the percent gel and percent swell of each vulcanizate, are given in Table I. The designation of infinity (∞) for percent swell in the table means that the composition was completely dissolved, indicating that no cross-linking had occurred.

*Examples 16–21*

In these examples, polyepichlorohydrin was milled and cross-linked with an equal weight mixture of zinc and magnesium oxides in the presence of different amounts of 2-mercaptoimidazoline. The amounts of the ingredients (by parts) in each formulation, along with the percent gel and percent swell of each vulcanizate, are given in Table II.

TABLE II

|  | Examples | | | | | |
|---|---|---|---|---|---|---|
|  | 16 | 17 | 18 | 19 | 20 | 21 |
| Polyepichlorohydrin (RSV 2.0) | 100 | 100 | 100 | 100 | 100 | 100 |
| Zinc oxide (ZnO) | 4.5 | 4.5 | 4.5 | 4.5 | 4.5 | 4.5 |
| Magnesium oxide (MgO) | 4.5 | 4.5 | 4.5 | 4.5 | 4.5 | 4.5 |
| 2-mercaptoimidazoline | 0.2 | 0.4 | 0.8 | 1.6 | 3.2 | 6.4 |
| Percent gel | 15 | 78 | 95 | 98 | 100 | 100 |
| Percent swell | 750 | 1,250 | 425 | 215 | 140 | 95 |
| Percent gel/percent swell | .02 | .06 | .22 | .46 | .72 | 1.05 |

*Examples 22–29*

In these examples, polyepichlorohydrin was milled and cross-linked with 2-mercaptoimidazoline in the presence of different amounts of zinc oxide and magnesium oxide. The amounts of the ingredients (by parts) in each formulation, along with percent gel and percent swell of each vulcanizate, are given in Table III.

TABLE III

|  | Examples | | | | | | | |
|---|---|---|---|---|---|---|---|---|
|  | 22 | 23 | 24 | 25 | 26 | 27 | 28 | 29 |
| Polyepichlorohydrin [1] | 100 | 100 | 100 | 100 | 100 | 100 | 100 | 100 |
| Zinc Oxide (ZnO) | 1 | 2 | 4 | 8 | 16 | 32 | 1 | 7 |
| Magnesium oxide (MgO) | 1 | 2 | 4 | 8 | 16 | 32 | 7 | 1 |
| 2-mercaptoimidazoline | 2 | 2 | 2 | 2 | 2 | 2 | 2 | 2 |
| Percent gel | 97 | 99 | 100 | 100 | 100 | 100 | 99 | 99 |
| Percent swell | 315 | 210 | 170 | 175 | 165 | 165 | 195 | 200 |

[1] RSV 2.0.

*Example 30*

In this example, polyepichlorohydrin was milled and cross-linked with zinc oxide, magnesium oxide, 2-mercaptoimidazoline and sulfur and the extent of vulcanization compared with controls wherein either the metal oxides or the mercaptoimidazoline were omitted. The amounts of the ingredients (by parts) in each formulation, along with the percent gel and percent swell in each vulcanizate, are given in Table IV.

TABLE I

|  | Controls | | | | | | | Examples | | | | | | | | | | | | | | |
|---|---|---|---|---|---|---|---|---|---|---|---|---|---|---|---|---|---|---|---|---|---|---|
|  | a | b | c | d | e | f | g | 1 | 2 | 3 | 4 | 5 | 6 | 7 | 8 | 9 | 10 | 11 | 12 | 13 | 14 | 15 |
| Polyepichlorohydrin [1] | 100 | 100 | 100 | 100 | 100 | 100 | 100 | 100 | 100 | 100 | 100 | 100 | 100 | 100 | 100 | 100 | 100 | 1000 | 100 | 100 | 100 | 100 |
| 2-mercaptoimidazoline |  | 2 |  |  |  |  |  | 2 | 2 | 2 | 2 | 2 | 2 | 2 | 2 | 2 | 2 | 2 | 2 | 2 | 2 | 2 |
| Stannous Oxide (SnO) |  |  | 9 |  |  |  |  | 9 |  |  |  |  | 4.5 | 4.5 | 4.5 | 4.5 |  |  |  |  |  |  |
| Plumbous Oxide (PbO) |  |  |  | 9 |  |  |  |  | 9 |  |  |  | 4.5 |  |  |  | 4.5 | 4.5 | 4.5 |  |  |  |
| Calcium Oxide (CaO) |  |  |  |  | 9 |  |  |  |  | 9 |  |  |  | 4.5 |  |  | 4.5 |  |  | 4.5 | 4.5 |  |
| Zinc Oxide (ZnO) |  |  |  |  |  | 9 |  |  |  |  | 9 |  |  |  | 4.5 |  |  | 4.5 |  | 4.5 |  | 4.5 |
| Magnesium Oxide (MgO) |  |  |  |  |  |  | 9 |  |  |  |  | 9 |  |  |  | 4.5 |  |  | 4.5 |  | 4.5 | 4.5 |
| Percent Gel | 0 | 0 | 0 | 0 | 0 | 0 | 0 | 87 | 100 | 96 | 101 | 100 | 99 | 100 | 98 | 99 | 100 | 100 | 100 | 100 | 100 | 100 |
| Percent Swell | ∞ | ∞ | ∞ | ∞ | ∞ | ∞ | ∞ | 375 | 205 | 195 | 200 | 215 | 300 | 210 | 225 | 235 | 150 | 170 | 175 | 145 | 135 | 180 |

[1] RSV 2.0.

TABLE IV

|  | Controls | | Example 30 |
|---|---|---|---|
|  | a | b |  |
| Polyepichlorohydrin (RSV 2.0) | 100 | 100 | 100 |
| Zinc oxide (ZnO) | | 4.5 | 4.5 |
| Magnesium oxide (MgO) | | 4.5 | 4.5 |
| 2-mercaptoimidazoline | 2 | | 2 |
| Sulfur | 2 | 2 | |
| Percent gel | 0 | 0 | 98 |
| Percent swell | ∞ | ∞ | 155 |

Example 31

Polyepichlorohydrin was compounded with metal oxides, 2-mercaptoimidazoline, carbon black and cross-linked. The formula used and the physical properties of the vulcanizate are tabulated below.

Formula: Parts
- Polyepichlorohydrin (SVR 2.0) — 100
- Zinc oxide (ZnO) — 4.5
- Magnesium oxide (MgO) — 4.5
- 2-mercaptoimidazoline — 2
- Fast extruding furnace black — 50

Physical properties:
- Tensile strength, p.s.i. — 1750
- Modulus 200% elongation — 1490
- Elongation at break — 250
- Mooney scorch (ASTM D 1077) 250° F. minutes to 10 point rise — 28

Examples 32-39

In these examples, polyepichlorohydrin was compounded with 2-mercaptoimidazoline, different lead compounds, carbon black and cross-linked. The amounts of the ingredients (by parts) in each formulation and the physical properties of the vulcanizates (before and after heat aging) are given in Table V.

TABLE V

|  | 32 | | 33 | | 34 | | 35 | |
|---|---|---|---|---|---|---|---|---|
| Polyepichlorohydrin (RSV 2.3) | 100 | | 100 | | 100 | | 100 | |
| Fast extruding furnace black | 50 | | 50 | | 50 | | 50 | |
| Polymerized trimethyl dihydroquinoline | 1.0 | | 1.0 | | 1.0 | | 1.0 | |
| 2-mercaptoimidazoline | 1.5 | | 1.5 | | 1.5 | | 1.5 | |
| Dibasic lead carbonate | 5.0 | | | | | | | |
| Red lead (Pb₃O₄) | | | 5.0 | | | | | |
| Lead carbonate | | | | | 5.0 | | | |
| Dibasic lead stearate | | | | | | | 5.0 | |
| Lead o-silicate | | | | | | | | |
| Lead Oleate | | | | | | | | |
| Dibasic lead phosphite | | | | | | | | |
| Dibasic lead phthalate | | | | | | | | |
|  | Un-aged | Aged[1] | Un-aged | Aged[1] | Un-aged | Aged[1] | Un-aged | Aged[1] |
| Modulus at 200% Elong., p.s.i. | 1,780 | 1,910 | 1,960 | 1,950 | 1,530 | 1,460 | 1,260 | 1,005 |
| Tensile strength, p.s.i. | 2,470 | 1,940 | 2,620 | 2,710 | 2,380 | 1,980 | 2,905 | 1,175 |
| Elongation, percent | 300 | 200 | 300 | 175 | 360 | 190 | 400 | 245 |
| Shore A2 Hardness | 67 | 82 | 70 | 84 | 68 | 81 | 68 | 79 |

|  | 36 | | 37 | | 38 | | 39 | |
|---|---|---|---|---|---|---|---|---|
| Polyepichlorohydrin (RSV 2.3) | 100 | | 100 | | 100 | | 100 | |
| Fast extruding furnace black | 50 | | 50 | | 50 | | 50 | |
| Polymerized trimethyl dihydroquinoline | 1.0 | | 1.0 | | 1.0 | | 1.0 | |
| 2-mecaptoimidazoline | 1.5 | | 1.5 | | 1.5 | | 1.5 | |
| Dibasic lead carbonate | | | | | | | | |
| Red lead (Pb₃O₄) | | | | | | | | |
| Lead carbonate | | | | | | | | |
| Dibasic lead stearate | | | | | | | | |
| Lead o-silicate | 5.0 | | | | | | | |
| Lead Oleate | | | 5.0 | | | | | |
| Dibasic lead phosphite | | | | | 5.0 | | | |
| Dibasic lead phthalate | | | | | | | 5.0 | |
|  | Un-aged | Aged[1] | Un-aged | Aged[1] | Un-aged | Aged[1] | Un-aged | Aged[1] |
| Modulus at 200% Elong., p.s.i. | 1,190 | 1,260 | 715 | 870 | 1,390 | 1,755 | 1,510 | 1,250 |
| Tensile strength, p.s.i. | 2,740 | 1,365 | 1,030 | 900 | 2,335 | 2,095 | 2,075 | 1,310 |
| Elongation, percent | 370 | 215 | 400 | 210 | 320 | 230 | 360 | 215 |
| Shore A2 Hardness | 67 | 74 | 70 | 80 | 68 | 75 | 72 | 72 |

[1] Aged in a circulating air oven for 3 days at 300° F.

Example 40

In this example, polyepichlorohydrin was compounded with 2-mercaptoimidazoline, metal oxides, carbon black stabilized with dibasic lead phthalate and cross-linked. A control sample was prepared in the same way except the dibasic lead phthalate was omitted. The amounts of the ingredients (by parts) in each formulation and the physical properties of the vulcanizates (before and after heat aging) are given in Table VI.

TABLE VI

|  | 40 | Control |
|---|---|---|
| Polyepichlorohydrin (RSV 2.0) | 100 | 100 |
| Fast extruding furnace black | 50 | 50 |
| N,N'-di(β-naphthyl)-p-phenylenediamine | 1 | 1 |
| Zinc oxide (ZnO) | 5 | 5 |
| Magnesium oxide (MgO) | 4 | 4 |
| 2-mercaptoimidazoline | 2 | 2 |
| Dibasic lead phthalate | 5 | |

|  | Unaged | Aged[1] | Unaged | Aged[1] |
|---|---|---|---|---|
| Modulus at 200% Elong., p.s.i. | 1,470 | 2,200 | 1,675 | |
| Tensile strength, p.s.i. | 1,780 | 2,325 | 1,875 | 500 |
| Elongation, percent | 300 | 180 | 300 | <50 |
| Shore A2 hardness | 74 | 78 | 77 | 84 |
| Condition | (2) | (2) | (2) | (3) |

[1] Aged in a circulating air oven for 2 days at 300° F.
[2] Flexible.
[3] Brittle.

Examples 41–44

In these examples, polyepichlorohydrin was compounded with different metal compounds, 2-mercaptoimidazoline, carbon black, stabilized with pentaerythritol and cross-linked. The amounts of the ingredients (by parts) in each formulation and the physical properties of the vulcanizates (before and after heat aging) are given in Table VII.

formulation and the physical properties of the vulcanizate are tabulated below.

| Formula: | Parts |
|---|---|
| Propylene oxide-epichlorohydrin (containing 20 mole percent propylene oxide and having an RSV of 8.9) | 100 |
| Fast extruding furnace black | 50 |
| Polymerized trimethyl dihydroquinoline | 1.0 |
| Red lead (Pb₃O₄) | 5.0 |
| 2-mercaptoimidazoline | 2.0 |
| Physical properties: | |
| Tensile strength, p.s.i. | 1985 |
| Modulus at 200% elongation, p.s.i. | 1720 |
| Elongation at break | 260 |
| Shore A2 hardness | 75 |
| Break set | 0 |

Examples 46–47

In these examples, polyepichlorohydrin was milled and cross-linked with an equal weight mixture of zinc and magnesium oxides in the presence of different heterocyclics. The amounts of the ingredients (by parts) in each formulation, along with the percent gel and percent swell of each vulcanizate are tabulated below.

|  | 46 | 47 |
|---|---|---|
| Polyepichlorohydrin (RSV 2.0) | 100 | 100 |
| Zinc oxide (ZnO) | 4.5 | 4.5 |
| Magnesium oxide (MgO) | 4.5 | 4.5 |
| 2-mercaptoimidazoline | 2 | |
| 2-mercaptopyrimidine | | 2 |
| Percent gel | 100 | 100 |
| Percent swell | 155 | 165 |

TABLE VII

|  | 41 | 42 | 43 | 44 |
|---|---|---|---|---|
| Polyepichlorohydrin (RSV 2.3) | 100 | 100 | 100 | 100 |
| Fast extruding furnace black | 50 | 50 | 50 | 50 |
| Polymerized trimethyl dihydroquinoline | 1 | 1 | 1 | 1 |
| 2-Mercaptoimidazoline | 2 | 2 | 2 | 2 |
| Pentaerythritol | 10 | 10 | 10 | 10 |
| Zinc Oxide (ZnO) | 5 | | | |
| Magnesium Oxide (MgO) | | 5 | | |
| Stannous Oxide (SnO₂) | | | 5 | |
| Calcium Oxide (CaO) | | | | 5 |

|  | Unaged | Aged[1] | Unaged | Aged[1] | Unaged | Aged[1] | Unaged | Aged[1] |
|---|---|---|---|---|---|---|---|---|
| Modulus at 100% Elongation, p.s.i. | 1,045 | 1,650 | 880 | 1,145 | 695 | 930 | 1,695 | 1,195 |
| Tensile Strength, p.s.i. | 1,925 | 2,010 | 1,490 | 1,570 | 1,500 | 1,430 | 2,120 | 1,705 |
| Elongation, percent | 260 | 135 | 320 | 145 | 320 | 165 | 135 | 150 |
| Shore A2 Hardness | 80 | 87 | 78 | 83 | 73 | 80 | 84 | 84 |
| Break Set, percent | 0 | 5 | 25 | 10 | 10 | 10 | 0 | 0 |

[1] Aged in a circulating air oven for 2 days at 300° F.

Example 45

In this example, propylene oxide-epichlorohydrin copolymer was compounded with 2-mercaptoimidazoline, red lead, carbon black and an antioxidant and then cross-linked. The amounts of the ingredients (by parts) in the

Examples 48–50

In these examples, epichlorohydrin-ethylene oxide copolymer was compounded with 2-mercaptoimidazoline, red lead, carbon black, stabilizer and cross-linked. In Example 49 azelaic acid was added in addition to the other compounds. In Example 50 tetradecandioic was added in addition to the other compounds. The amounts of the ingredients (by parts) in each formulation and the physical properties of the vulcanizates (before and after heat aging) are given in Table VIII.

formulation and the physical properties of the vulcanizates (before and after heat aging) are given in Table IX.

TABLE IX

|  | 51 | | | 52 | | | 53 | | |
|---|---|---|---|---|---|---|---|---|---|
|  |  | Aged[2] 5 days | Aged[2] 10 days |  | Aged[2] 5 days | Aged[2] 10 days |  | Aged[2] 5 days | Aged[2] 10 days |
| Epichlorohydrin, ethylene oxide copolymer [1] | 100 | | | 100 | | | 100 | | |
| Zinc Stearate | 0.75 | | | 0.75 | | | 0.75 | | |
| High abrasion furnace black | 50 | | | 50 | | | 50 | | |
| Nickel dibutyl dithiocarbamate | 1.0 | | | 1.0 | | | 2.0 | | |
| Red lead | 7.5 | | | 7.5 | | | 7.5 | | |
| Azelaic acid | 4.0 | | | 4.0 | | | 4.0 | | |
| Zinc salt of 2-mercaptobenzimidazole | | | | 0.5 | | | | | |
| 2-mercaptoimidazoline | 1.5 | | | 1.5 | | | 1.5 | | |
|  | Unaged | Aged[2] 5 days | Aged[2] 10 days | Unaged | Aged[2] 5 days | Aged[2] 10 days | Unaged | Aged[2] 5 days | Aged[2] 10 days |
| 100% modulus, p.s.i | 955 | 925 | 475 | 845 | 1,350 | 985 | 885 | 985 | 820 |
| Tensile strength, p.s.i | 3,000 | 2,050 | 745 | 2,900 | 2,200 | 1,425 | 2,625 | 1,975 | 1,425 |
| Maximum elongation, percent | 225 | 195 | 145 | 260 | 140 | 125 | 250 | 155 | 155 |
| Shore "A" hardness | 73 | 76 | 74 | 71 | 81 | 78 | 78 | 73 | 75 |
| Break Set, percent | 5 | 0 | 10 | 10 | 0 | 0 | 0 | 0 | 0 |

[1] 68 wt. percent epichlorohydrin, RSV 5.0.
[2] 300° F. in an air circulating oven.

Examples 54 and 55

In these examples, epichlorohydrin-ethylene oxide copolymer was compounded with 2-mercaptoimidazoline,

TABLE VIII

|  | 48 | | 49 | | | 50 | | |
|---|---|---|---|---|---|---|---|---|
| Epichlorohydrin, ethylene oxide copolymer [1] | 100 | | 100 | | | 100 | | |
| Zinc stearate | 0.75 | | 0.75 | | | 0.75 | | |
| High abrasion furnace black | 50 | | 50 | | | 50 | | |
| Nickel dibutyl dithiocarbamate | 1.0 | | 1.0 | | | 1.0 | | |
| Red lead | 5.0 | | 5.0 | | | 5.0 | | |
| Azelaic acid | | | 2.0 | | | | | |
| Tetradecandioic acid | | | | | | 2.74 | | |
| 2-mercaptoimidazoline | 1.5 | | 1.5 | | | 1.5 | | |
|  | Unaged | Aged[2] 5 days | Unaged | Aged[2] 5 days | Aged[2] 10 days | Unaged | Aged[2] 5 days | Aged[2] 10 days |
| 100% modulus, p.s.i | 830 | 445 | 880 | 690 | 360 | 850 | 760 | 485 |
| Tensile strength, p.s.i | 2,500 | 960 | 2,250 | 1,780 | 960 | 2,175 | 1,715 | 1,045 |
| Maximum elongation, percent | 290 | 160 | 290 | 230 | 250 | 300 | 190 | 205 |
| Shore "A" hardness | 81 | 75 | 71 | 75 | 65 | 76 | 80 | 75 |
| Break set, percent | 10 | 5 | 10 | 5 | 20 | 10 | 5 | 20 |

[1] 68 wt. percent epichlorohydrin, RSV 5.0.
[2] 300° F. in an air circulating oven.

Examples 51–53

In these examples, epichlorohydrin-ethylene oxide copolymer was compounded with 2-mercaptoimidazoline, red lead, azelaic acid, carbon black, a stabilizer and cross-linked. The amounts of the ingredients (by parts) in each red lead, azelaic acid, carbon black, various stabilizers and cross-linked. The amounts of the ingredients (by parts) in each formulation and the physical properties of the vulcanizate (before and after heat aging) are given in Table X.

TABLE X

|  | 54 | | | | | 55 | | | | |
|---|---|---|---|---|---|---|---|---|---|---|
| Epichlorohydrin, ethylene oxide copolymer [1] | 100 | | | | | 100 | | | | |
| Zinc stearate | 0.75 | | | | | 0.75 | | | | |
| High abrasion furnace black | 50 | | | | | 50 | | | | |
| Red lead | 7.5 | | | | | 7.5 | | | | |
| Azelaic acid | 4.0 | | | | | 4.0 | | | | |
| Nickel dibutyldithiocarbamate | 1.0 | | | | | 1.0 | | | | |
| Zinc salt of 2-mercaptobenzimidazole | 0.5 | | | | | | | | | |
| Copper stearate | 0.5 | | | | | | | | | |
| Diphenyl p-phenylenediamine | | | | | | 1.0 | | | | |
| 2-mercaptoimidazoline | 1.5 | | | | | 1.5 | | | | |
|  | Unaged | Aged[2] 7 days | Aged[2] 14 days | Aged[2] 21 days | Aged[3] 2 days | Unaged | Aged[2] 7 days | Aged[2] 14 days | Aged[2] 21 days | Aged[3] 2 days |
| 100% modulus, p.s.i | 865 | 980 | 685 | 530 | 1,085 | 760 | 845 | 575 | 400 | 690 |
| Tensile strength, p.s.i | 1,990 | 1,725 | 1,090 | 610 | 1,505 | 2,050 | 1,700 | 1,170 | 635 | 1,200 |
| Maximum elongation, percent | 315 | 165 | 180 | 125 | 115 | 300 | 190 | 200 | 185 | 180 |
| Shore "A" hardness | 74 | 77 | 74 | 68 | 76 | 75 | 75 | 74 | 70 | 68 |

[1] 68 wt. percent epichlorohydrin, RSV 5.0.
[2] 300° F. in an air circulating oven.
[3] 350° F. in an air circulating oven.

What we claim and desire to protect by Letters Patent is:

1. A cross-linked polymer of an epihalohydrin prepared by heating a polymer of an epihalohydrin in the presence of a cross-linking formulation consisting essentially of from about 2% to about 20% by weight of at least one metal compound selected from the group consisting of salts of aromatic carboxylic acids, salts of saturated aliphatic carboxylic acids, salts of carbonic acid, salts of phosphorous acid, salts of silicic acid and oxides of beryllium, magnesium, calcium, strontium, barium and the metals of Groups IIB, and IVA of the Periodic Table and from about 0.2% to about 10% by weight of at least one other agent selected from the group consisting of 2-mercaptoimidazolines and 2-mercaptopyrimidines, said epihalohydrin polymer having a molecular weight of at least about 40,000 and being selected from the group consisting of homopolymers of epihalohydrins and copolymers of an epihalohydrin with at least one other epoxide.

2. The composition of claim 1 wherein the epihalohydrin polymer is polyepichlorohydrin.

3. The composition of claim 2 wherein said polyepichlorohydrin was cross-linked by heating in the presence of 2-mercaptoimidazoline and a lead carbonate.

4. The composition of claim 2 wherein said polyepichlorohydrin was cross-linked by heating in the presence of 2-mercaptoimidazoline and red lead.

5. The composition of claim 1 wherein the epihalohydrin polymer is a copolymer of ethylene oxide and epichlorohydrin.

6. The composition of claim 1 wherein the epihalohydrin polymer is a copolymer of propylene oxide and epichlorohydrin.

7. The composition of claim 1 wherein said polymer was cross-linked in the presence of at least one lead compound selected from the group consisting of lead salts of aromatic carboxylic acids, lead salts of aliphatic carboxylic acids, lead salts of carbonic acid, lead salts of phosphorous acid, lead salts of silicic acid and lead oxides.

8. The composition of claim 7 wherein the lead compound is lead azelate.

9. A cross-linked polymer of an epihalohydrin prepared by heating a polymer of an epihalohydrin in the presence of (1) from about 0.5% to about 20% by weight of a stabilizer comprising pentaerythritol, and (2) a cross-linking formulation consisting essentially of from about 2% to about 20% by weight of at least one metal compound selected from the group consisting of salts of aromatic carboxylic acids, salts of saturated aliphatic carboxylic acids, salts of carbonic acid, salts of phosphorous acid, salts of silicic acid and oxides of beryllium, magnesium, calcium, strontium, barium, zinc, cadmium, mercury germanium, and tin, and from about 0.2% to about 10% by weight of at least one other agent selected from the group consisting of 2-mercaptoimidazolines and 2-mercaptopyrimidines said epihalohydrin polymer having a molecular weight of at least about 40,000 and being selected from the group consisting of homopolymers of epihalohydrins and copolymers of an epihalohydrin with at least one other epoxide.

10. The composition of claim 9 wherein the metal compound is zinc oxide and the other agent is 2-mercaptoimidazoline.

11. The process of cross-linking a polymer of an epihalohydrin which comprises heating said polymer in the presence of (1) from about 0.5% to about 20% of a stabilizer comprising pentaerythritol and (2) a cross-linking formulation consisting essentially of from about 2% to about 20% of at least one metal compound selected from the group consisting of salts of aromatic carboxylic acids, salts of saturated aliphatic carboxylic acids, salts of carbonic acid, salts of phosphorous acid, salts of silicic acid and oxides of beryllium, magnesium, calcium, strontium, barium, zinc, cadmium, mercury, germanium, and tin, and from about 0.2% to about 10% of at least one other agent selected from the group consisting of 2-mercaptoimidazolines and 2-mercaptopyrimidines said epihalohydrin polymer having a molecular weight of at least about 40,000 and being selected from the group consisting of homopolymers of epihalohydrins and copolymers of an epihalohydrin with at least one other epoxide.

12. The process of cross-linking a polymer of an epihalohydrin which comprises heating said polymer in the presence of a cross-linking formulation consisting essentially of from about 2% to about 20% of from about 2% to about 20% by weight of at least one metal compound selected from the group consisting of salts of aromatic carboxylic acids, salts of saturated aliphatic carboxylic acids, salts of carbonic acid, salts of phosphorous acid, salts of silicic acid and oxides of beryllium, magnesium, calcium, strontium, barium and metals of Groups IIB and IVB of the Periodic Table and from about 0.2% to about 10% of at least one other agent selected from the group consisting of 2-mercaptoimidazolines and 2-mercaptopyrimidines, said epihalohydrin polymer having a molecular weight of at least about 40,000 and being selected from the group consisting of homopolymers of epihalohydrins and copolymers of an epihalohydrin with at least one other epoxide.

13. The process of claim 12 wherein said polymer is cross-linked in the presence of at least one lead compound selected from the group consisting of lead salts of aromatic carboxylic acids, lead salts of saturated aliphatic carboxylic acids, lead salts of carbonic acid, lead salts of phosphorous acid, lead salts of silicic acid and lead oxides.

14. The process of claim 12 wherein the metal compound is red lead.

15. The process of claim 12 wherein the metal compound is lead azelate.

16. The process of claim 12 wherein the metal compound is a lead carbonate.

17. The process of claim 12 wherein the other agent is 2-mercaptoimidazoline.

18. The process of claim 12 wherein the other agent is 2-mercaptopyrimidine.

References Cited

UNITED STATES PATENTS 3,239,486    3/1966    Willis _____ 260—45.75

DONALD E. CZAJA, *Primary Examiner.*

LEON J. BERCOVITZ, *Examiner.*

C. W. IVY, *Assistant Examiner.*